(12) United States Patent
Mitsunaga

(10) Patent No.: US 11,411,400 B2
(45) Date of Patent: Aug. 9, 2022

(54) DC POWER SUPPLY SYSTEM

(71) Applicant: TDK Corporation, Tokyo (JP)

(72) Inventor: Takuma Mitsunaga, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/428,120

(22) PCT Filed: Feb. 4, 2019

(86) PCT No.: PCT/JP2019/003848
§ 371 (c)(1),
(2) Date: Aug. 3, 2021

(87) PCT Pub. No.: WO2020/161765
PCT Pub. Date: Aug. 13, 2020

(65) Prior Publication Data
US 2022/0060016 A1 Feb. 24, 2022

(51) Int. Cl.
*H02J 7/34* (2006.01)
*H02J 1/00* (2006.01)
(Continued)

(52) U.S. Cl.
CPC ............ *H02J 1/14* (2013.01); *H02J 3/004* (2020.01); *H02J 3/381* (2013.01); *H02J 7/0068* (2013.01);
(Continued)

(58) Field of Classification Search
CPC .... H02J 1/14; H02J 3/004; H02J 3/381; H02J 7/0068; H02J 7/35; H02J 2300/22;
(Continued)

(56) References Cited

U.S. PATENT DOCUMENTS

| | | | |
|---|---|---|---|
| 2011/0148195 A1* | 6/2011 | Lee | ............................ H02J 7/35 307/25 |
| 2016/0043597 A1* | 2/2016 | Kuwahara | ............... H02J 3/381 307/23 |
| 2019/0207389 A1 | 7/2019 | Tang et al. | |

FOREIGN PATENT DOCUMENTS

| | | |
|---|---|---|
| JP | 2008-148442 A | 6/2008 |
| JP | 2010-273519 A | 12/2010 |
| WO | 2013/128731 A1 | 9/2013 |

OTHER PUBLICATIONS

International Search Report issued in a corresponding International Patent Application No. PCT/JP2019/003848, dated Mar. 12, 2019, with English translation.

* cited by examiner

*Primary Examiner* — Toan T Vu
(74) *Attorney, Agent, or Firm* — McDermott Will & Emery LLP

(57) ABSTRACT

A DC power supply system includes: a natural energy power generator connected to a DC bus through a first DC-DC converter; a load device connected to the DC bus through a second DC-DC converter; a storage battery connected to the DC bus through a third DC-DC converter and configured to be charged with a generated power when the generated power is larger than a load power and to be discharged to supply power to the load device when the generated power is smaller than the load power; and a power management apparatus that manages operations of the first to third DC-DC converters based on current power generation amount and load power amount, prediction values for future power generation amount and load power amount, a remaining capacity of the storage battery, preset target values for respective blackout rate, battery lifetime, and power suppression rate, and the priorities among the target values.

10 Claims, 7 Drawing Sheets

(51) Int. Cl.
*H02J 1/14* (2006.01)
*H02J 3/00* (2006.01)
*H02J 3/38* (2006.01)
*H02J 7/00* (2006.01)
*H02J 7/35* (2006.01)

(52) U.S. Cl.
CPC ............ *H02J 7/35* (2013.01); *H02J 2300/22* (2020.01); *H02J 2300/28* (2020.01)

(58) Field of Classification Search
CPC .. H02J 2300/28; H02J 7/34; H02J 1/10; H02J 3/32
See application file for complete search history.

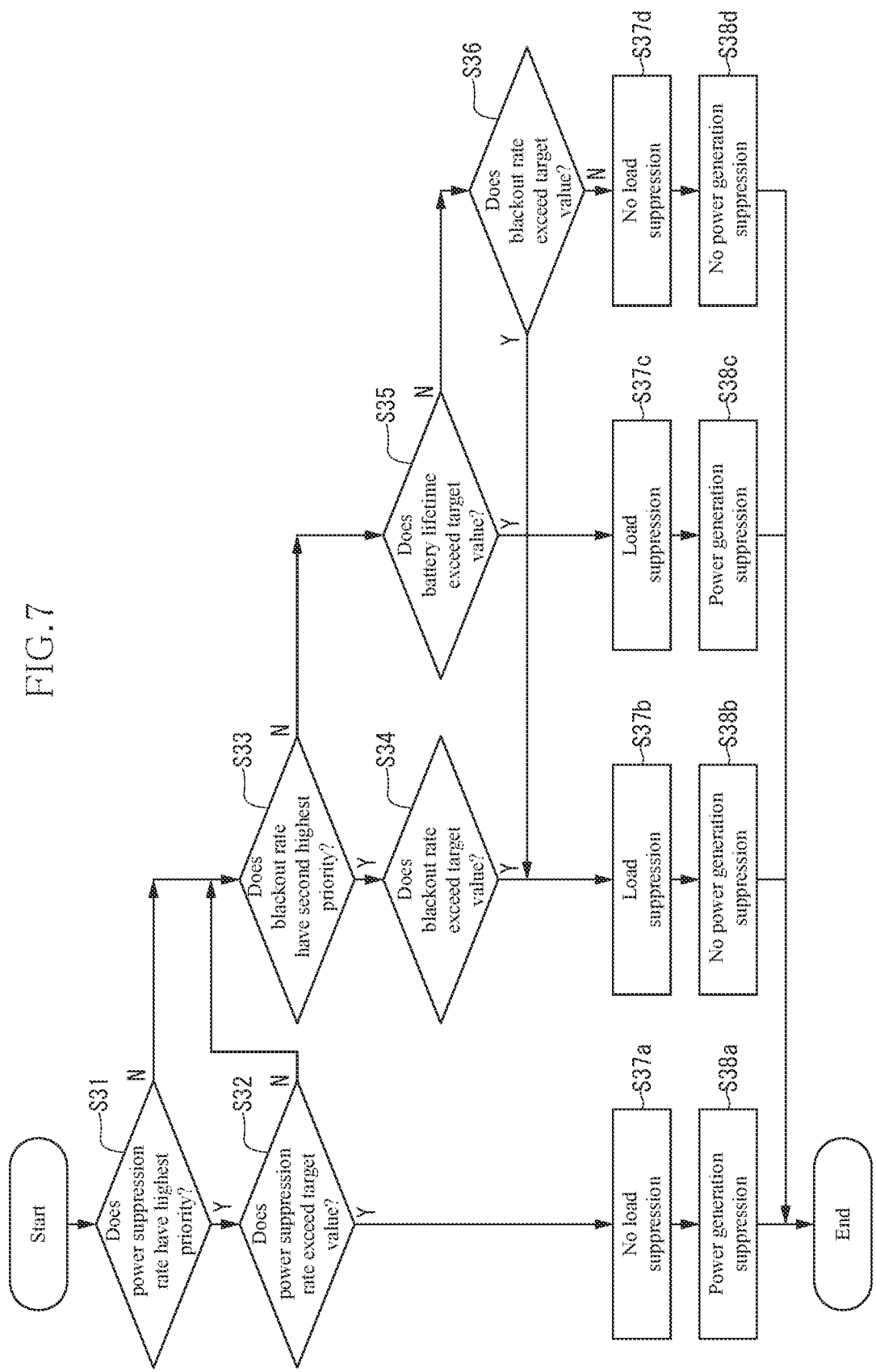

DC POWER SUPPLY SYSTEM

CROSS REFERENCE

This application is the U.S. National Phase under 35 U.S.C. § 371 of International Application No. PCT/JP2019/003848, filed on Feb. 4, 2019, the entire contents of each are hereby incorporated by reference.

TECHNICAL FIELD

The present invention relates to a DC power supply system and, more particularly, to a DC power supply system constituted by combining a natural energy power generator such as a solar power generator and a storage battery.

BACKGROUND ART

As countermeasures to overcome actualization of global environmental problems, typically global warming and acid rain and depletion of fossil resources, and for ensuring energy security, etc., power generation facilities utilizing natural energy such as wind power and sunlight have been increasingly introduced.

In particular, in many regions where a power supply system is not organized, such as isolated areas and depopulation areas in tropical zones, power is currently generated mainly by means of a diesel engine generator. However, such regions are suitable for solar power generation because of good insolation, so that there are increasing needs for a power supply system that can improve economic performance and contribute to achievement of a low-carbon society by utilizing renewable energy. Further, also in regions where a power system infrastructure has been established, there has been an increasing expectation for a DC power supply system. In this system, when a power system stops due to natural disaster or the like, a solar power system installed in a customer facility is disconnected from the power system and made to operate independently so as to stably and continuously supply power to a load even during system shutdown.

Regarding a DC power supply system, for example, Patent Document 1 describes a method of calculating demand prediction data for a load device and power output prediction data for a natural energy generator by using weather forecast data, suppressing power output from the natural energy generator when it is predicted based on the demand prediction data and the power output prediction data that charging of a storage battery will take place at a level exceeding the maximum charging power of the storage battery, and suppressing power consumption by a load for adjustment when it is predicted based on the demand prediction data and the power output prediction data that power discharge from the storage battery will exceed the maximum discharge power of the storage battery.

CITATION LIST

Patent Document

[Patent Document 1] Pamphlet of International Publication No. 2013/128731

DISCLOSURE OF THE INVENTION

Problem to be Solved by the Invention

The DC power supply system described in Patent Document 1 can stably supply power while preventing the overcharge and overdischarge of the storage battery, but does not consider battery lifetime, leaving behind the possible risk of shortening the battery service life.

It is therefore an object of the present invention to provide a DC power supply system capable of not only stably supplying power but also prolonging battery lifetime.

Means for Solving the Problem

To solve the above problem, a DC power supply system according to the present invention includes: a DC bus serving as a bus bar for DC power supply; first to third DC-DC converters connected to the DC bus; a natural energy power generator that is connected to the DC bus through the first DC-DC converter and supplies generated power to the DC bus; a load device that is connected to the DC bus through the second DC-DC converter and receives supply of a load power from the DC bus; a storage battery that is connected to the DC bus through the third DC-DC converter and configured to be charged with the generated power when the generated power is larger than the load power and to be discharged to supply power to the load device when the generated power is smaller than the load power; and a power management apparatus that manages operations of the first to third DC-DC converters based on current power generation amount and load power amount, prediction values for future power generation amount and load power amount, the remaining capacity of the storage battery, previously set target values for respective blackout rate, battery lifetime, and power suppression rate, and the priorities among the target values.

According to the present invention, it is possible to bring the blackout rate, battery lifetime, and power suppression rate to close to their target values based on the power generation amount, load power amount, and remaining capacity of the storage battery. Thus, it is possible to not only perform stable power supply but also prolong the battery lifetime.

In the present invention, the power management apparatus preferably includes a target value setting part for setting the target values for respective blackout rate, battery lifetime, and power suppression rate and a priority setting part for setting the priorities among the target values for respective blackout rate, battery lifetime, and power suppression rate. The power management apparatus further preferably includes a weather data acquisition part that acquires weather forecast data, a data storage that stores data of the power generation amount and load power amount, and a power amount estimator that estimates a future power generation amount and a future load power amount based on the weather forecast data and the data of the power generation amount and load power amount stored in the data storage. With this configuration, it is possible to calculate the prediction values for the future power amount and load power amount from the current power generation amount and load power amount and weather information. Further, based on the calculated prediction values for the future power amount and load power amount, the blackout rate, battery lifetime, and power suppression rate can be brought close to their target values.

In the present invention, when the prediction value for the blackout rate exceeds the target value for the blackout rate, the power management apparatus preferably controls the second DC-DC converter so as to suppress the load power amount. Further, when the prediction value for the battery lifetime exceeds the target value for the battery lifetime, the power management apparatus preferably controls the second DC-DC converter so as to suppress the load power amount and controls the first DC-DC converter so as to suppress the power generation amount. Furthermore, when the prediction value for the power suppression rate exceeds the target value for the power suppression rate, the power management apparatus preferably controls the first DC-DC converter so as to suppress the power generation amount. By thus suppressing at least one of the power generation amount and the load power amount, the blackout rate, battery lifetime, or power suppression rate can be brought close to its target value.

In the present invention, the power management apparatus preferably dynamically changes the priorities among the target values for respective blackout rate, battery lifetime, and power suppression rate. This allows the blackout rate, battery lifetime, and power suppression rate to be finely controlled in accordance with requests from an administrator (customer) and weather conditions.

The DC power supply system according to the present invention preferably further includes an administrator terminal configured to communicate with the power management apparatus, and the power management apparatus preferably notifies the administrator terminal of recommended values for the target values for respective blackout rate, battery lifetime, and power suppression rate and those for the priorities. Thus, it is possible to reliably notify the administrator of the operation status of the DC power supply system.

In the present invention, the power management apparatus preferably automatically sets the recommended values for the target values for respective blackout rate, battery lifetime, and power suppression rate, and those for the priorities. Thus, it is possible to adequately set the target values for respective blackout rate, battery lifetime, and power suppression rate and the priorities among them without imposing a burden on the administrator.

In the present invention, the first DC-DC converter is preferably a step-up converter that steps up a power from the natural energy power generator and supplies the resultant power to the DC bus, the second DC-DC converter is a step-down converter that steps down a power on the DC bus and supplies the resultant power to the load device, and the third DC-DC converter is a bidirectional DC-DC converter that steps down or up a power on the DC bus and supplies the resultant power to the storage battery, as well as steps up or down a power from the storage battery and supplies the resultant power to the DC bus. This allows power to be supplied from the DC bus to the load device and storage battery, as well as allows power to be supplied from the natural energy power generator or storage battery to the DC bus.

Advantageous Effects of the Invention

According to the present invention, there can be provided a DC power supply system capable of not only performing stable power supply but also prolonging the battery lifetime.

BRIEF DESCRIPTION OF THE DRAWINGS

FIGS. 2A and 2B are views for explaining the operation of the DC power supply system 1, wherein FIG. 2A illustrates an operation for charging the storage battery, and FIG. 2B illustrates an operation for discharging the storage battery.

FIG. 7 is a flowchart of the power generation/load control performed when the power suppression rate has the highest priority.

MODE FOR CARRYING OUT THE INVENTION

Hereinafter, a preferred embodiment of the present invention will be described in detail with reference to the accompanying drawings.

Figure 1:
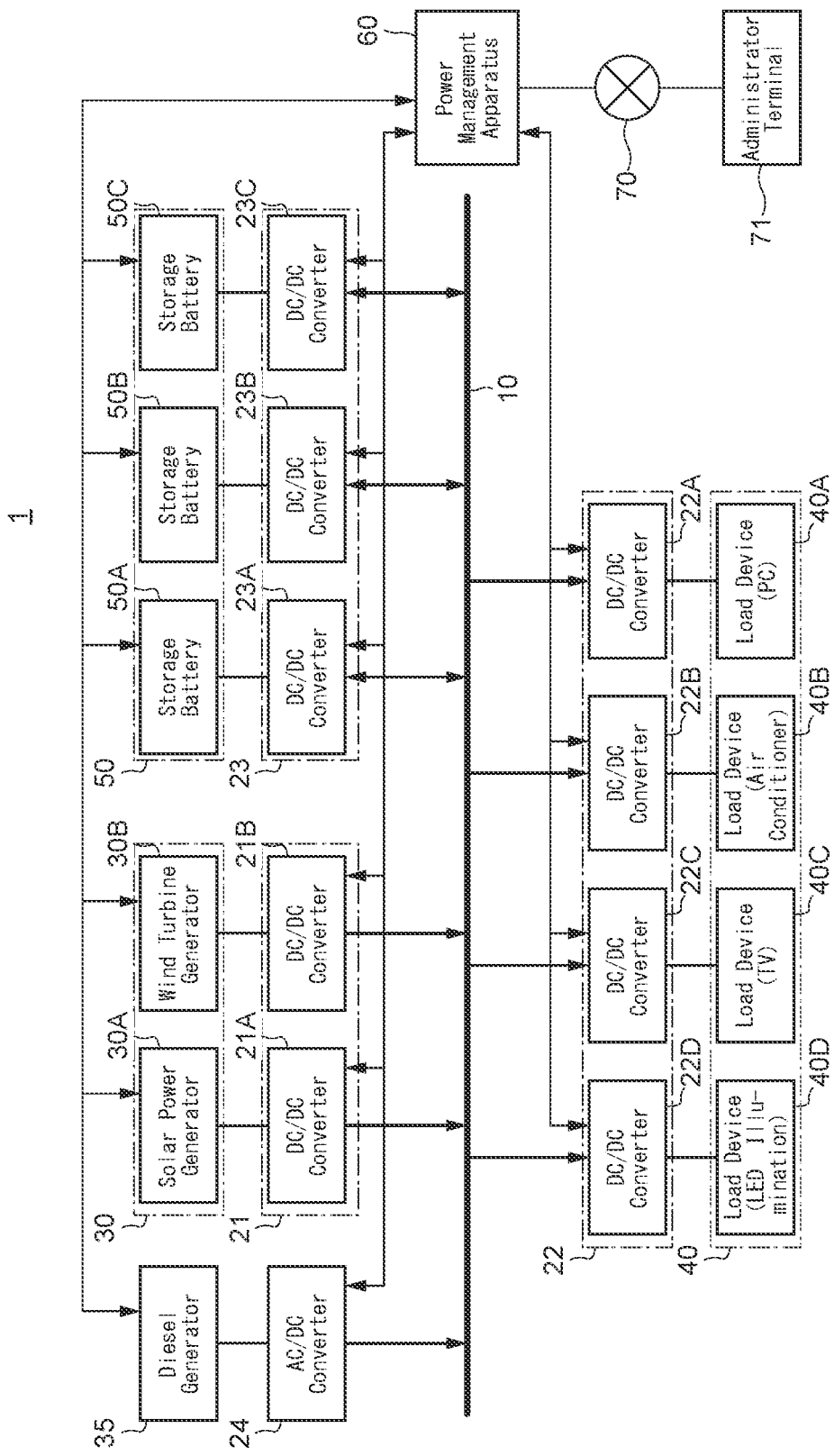
FIG. 1 is a block diagram schematically illustrating the configuration of a DC power supply system according to an embodiment of the present invention.

FIG. 1 is a block diagram schematically illustrating the configuration of a DC power supply system according to an embodiment of the present invention.

As illustrated in FIG. 1, a DC power supply system 1 includes a DC bus 10 serving as a bus bar for DC power supply, first to third DC-DC converters 21 to 23 connected to the DC bus 10, a natural energy power generator 30 connected to the DC bus 10 through the first DC-DC converter 21, a load device 40 connected to the DC bus 10 through the second DC-DC converter 22, a storage battery 50 connected to the DC bus 10 through the third DC-DC converter 23, a power management apparatus 60 that manages the entire system including operations of the first to third DC-DC converters 21 to 23 such that it compares the amount of power generated by the natural energy power generator 30 and the amount of load power consumed by the load device 40, charges the storage battery 50 when the power generation amount exceeds the load power amount, and discharges the storage battery 50 when the load power amount exceeds the power generation amount, and an administrator terminal 71 configured to communicate with the power management apparatus 60 over a communication network 70 such as Internet.

The DC bus 10 is a high-voltage DC transmission line of, e.g., 350±100 V. Thus, when a device operating at a voltage lower than 350±100 V is connected to the DC bus 10, it needs to be connected thereto through a DC-DC converter. The first DC-DC converter 21 is a unidirectional DC-DC converter (step-up converter) that steps up a power of, e.g., 240 V from the natural energy power generator 30 to 350 V and supplies the resultant power to the DC bus 10. The second DC-DC converter 22 is a unidirectional DC-DC converter (step-down converter) that steps down a power of 350 V on the DC bus 10 to 24 V and supplies the resultant power to the load device 40. The third DC-DC converter 23 is a bidirectional DC-DC converter that steps down or up a power on the DC bus 10 and supplies the resultant power to the storage battery 50, as well as steps up or down a power from the storage battery 50 and supplies the resultant power to the DC bus 10. The first to third DC-DC converters 21 to 23 have an ON/OFF command reception function and a power amount regulation command reception function and are configured to communicate with the power management apparatus 60.

The natural energy power generator 30 is, for example, a solar power generator 30A and a wind turbine generator 30B. In the present embodiment, the solar power generator 30A includes a solar panel and a power conditioner and is connected to the DC bus 10 through a first DC-DC converter 21A. The wind turbine generator 30B includes a generator main body and a power conditioner and is connected to the DC bus 10 through a first DC-DC converter 21B. The first DC-DC converters 21A and 21B may each be incorporated in its corresponding power conditioner. The power conditioner has a MPPT (Maximum Power Point Tracking) function, an ON/OFF command reception function, a power amount regulation command reception function, a power generation information transmission function, and the like and is configured to communicate with the power management apparatus 60. Although the type and the number of the natural energy power generators 30 to be connected to the DC bus 10 are not particularly limited, the solar power generator 30A is preferably provided as the natural energy power generator 30. The power generated by the solar power generator 30A and wind turbine generator 30B is supplied to the load device 40 and storage battery 50 through the DC bus 10.

The load device 40 (load devices 40A to 40D) may be, for example, a PC, an air conditioner, a TV, an LED illumination device, and the like. The load devices 40A to 40D are connected to the DC bus 10 through second DC-DC converters 22A to 22D, respectively, and receive power supply from the DC bus 10.

The storage battery 50 includes a plurality of storage batteries 50A to 50C. The storage batteries 50A to 50C each include a storage battery main body (battery cell) and a BMU (Storage battery Management Unit) for monitoring and controlling a charge state. The storage batteries 50A to 50C are connected to the DC bus 10 through the third DC-DC converters 23A to 23C, respectively. When the power generated by the natural energy power generator 30 is larger than the power (load power) consumed by the load device 40, the storage batteries 50A to 50C are charged with the surplus of the generated power; while when the load power is larger than the generated power, the storage batteries 50A to 50C are discharged to supplement the deficiency of the load power. The BMU of the storage battery 50 has an ON/OFF command reception function, a DC bus voltage regulation command reception function, a charge/discharge current amount regulation command reception function, a storage battery information transmission function, and the like and is configured to communicate with the power management apparatus 60. The storage battery charging rate of each of the storage batteries 50A to 50C is indicated by a SOC (State Of Charge: remaining capacity (Ah)/full charge capacity (Ah)×100), which is notified to the power management apparatus 60 as needed.

The DC power supply system 1 may further include a diesel generator 35. When the power generated by the natural energy power generator 30 is low, or when the remaining capacity of the storage battery 50 is small, the diesel generator 35 is activated to forcibly increase the amount of power generation. This can avoid a regulation of load power and a blackout, allowing power to be stably supplied to the load device 40. Further, the diesel generator 35 can be used as a power source for start-up of the entire system including the DC bus 10. In general, the diesel generator 35 generates an AC output and is thus connected to the DC bus 10 through an AC-DC converter 24.

The power management apparatus 60 is a computer system equipped with an EMS (Energy Management System). The power management apparatus 60 can remotely control input/output operations of the DC-DC converters 21 to 23 and control the amount of power generated by the natural energy power generator 30 and the power demand of the load device 40. To maintain the voltage on the DC bus 10, the power management apparatus 60 issues commands to the natural energy power generator 30, load device 40, and storage battery 50 and collects information from these devices. The command issuance and information collection are performed using a communication scheme such as RS-232C, RS-485, a CAN (Controller Area Network), Ethernet, Wi-Fi, or the like.

Figure 2A:
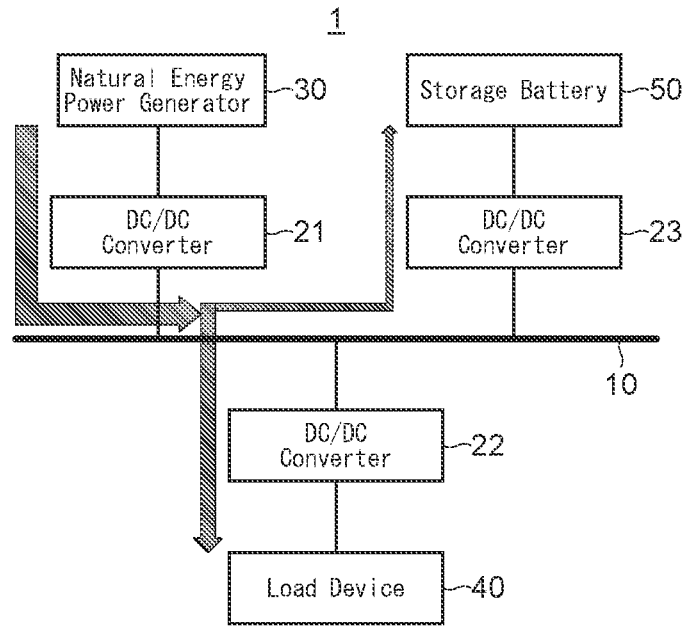
Figure 2B:
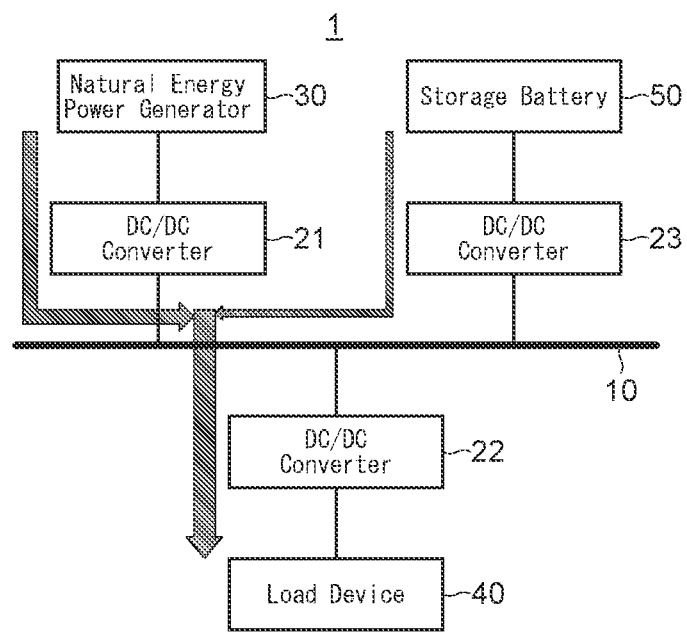

FIGS. 2A and 2B are views for explaining the operation of the DC power supply system 1. FIG. 2A illustrates an operation for charging the storage battery 50, and FIG. 2B illustrates an operation for discharging the storage battery 50.

As illustrated in FIG. 2A, when the amount of power generated by the natural energy power generator 30 is larger than the amount of load power consumed by the load device 40, the storage battery 50 is charged with the surplus of the generated power. The power generated by the natural energy power generator 30 is supplied to the storage battery 50 through the first DC-DC converter 21, the DC bus 10, and the third DC-DC converter 23.

As illustrated in FIG. 2B, when the amount of load power consumed by the load device 40 is larger than the amount of power generated by the natural energy power generator 30, the storage battery 50 is discharged to supply a necessary power to the load device 40. The power from the storage battery 50 is supplied to the load device 40 through the third DC-DC converter 23, the DC bus 10, and the second DC-DC converter 22.

Figure 3:
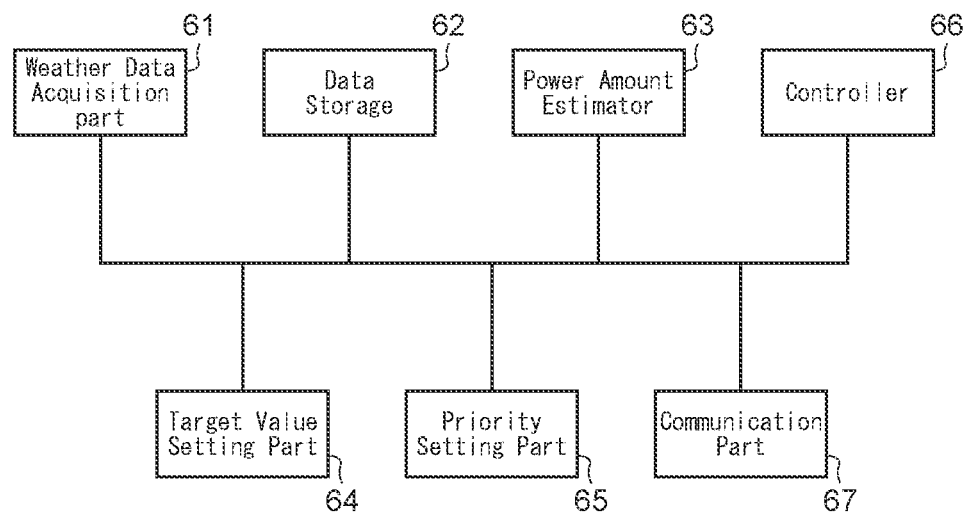
FIG. 3 is a block diagram illustrating the configuration of the power management apparatus 60.

FIG. 3 is a block diagram illustrating the configuration of the power management apparatus 60.

As illustrated in FIG. 3, the power management apparatus 60 includes a weather data acquisition part 61 that acquires weather forecast data, a data storage 62 storing data of the amount of power generated by the natural energy power generator 30 and data of the amount of load power consumed by the load device 40, a power amount estimator 63 that estimates a future power generation amount and a future load power amount based on the weather forecast data and the data of the power generation amount and data of the load power amount stored in the data storage 62, a target value setting part 64 setting a target blackout rate, a target battery lifetime, and a target power suppression rate, a priority setting part 65 setting the priorities among control for bringing the blackout rate close to its target value, control for bringing the battery lifetime close to its target value, and control for bringing the power suppression rate close to its target value, a controller 66 that controls the operations of the first to third DC-DC converters 21 to 23, and a communication part 67 that communicates with the administrator terminal 71 and the like through the communication network 70.

In the present embodiment, the target value setting part 64 and priority setting part 65 of the power management apparatus 60 can set, according to a command from the administrator terminal 71, the target blackout rate, target battery lifetime, and target power suppression rate and the priorities among them. Alternatively, the target value setting part 64 and priority setting part 65 may automatically set recommended values for the target blackout rate, target battery lifetime, and target power suppression rate and those for the priorities among them, which are prepared in advance considering factors such as season and weather. In this case, the target value setting part 64 and priority setting part 65 may dynamically change the target blackout rate, target battery lifetime, and target power suppression rate and the priorities among them. This allows the blackout rate, battery lifetime, and power suppression rate to be finely controlled in accordance with requests from the administrator (customer) and weather conditions.

The power management apparatus 60 preferably notifies the administrator terminal 71 of the recommended values for the target blackout rate, target battery lifetime, and target power suppression rate and those for the priorities among them. Thus, it is possible to set the blackout rate, battery lifetime, and power suppression rate and the priorities among them without imposing a burden on the administrator. Further, it is possible to reliably notify the administrator of the operation status of the DC power supply system 1.

Figure 4:
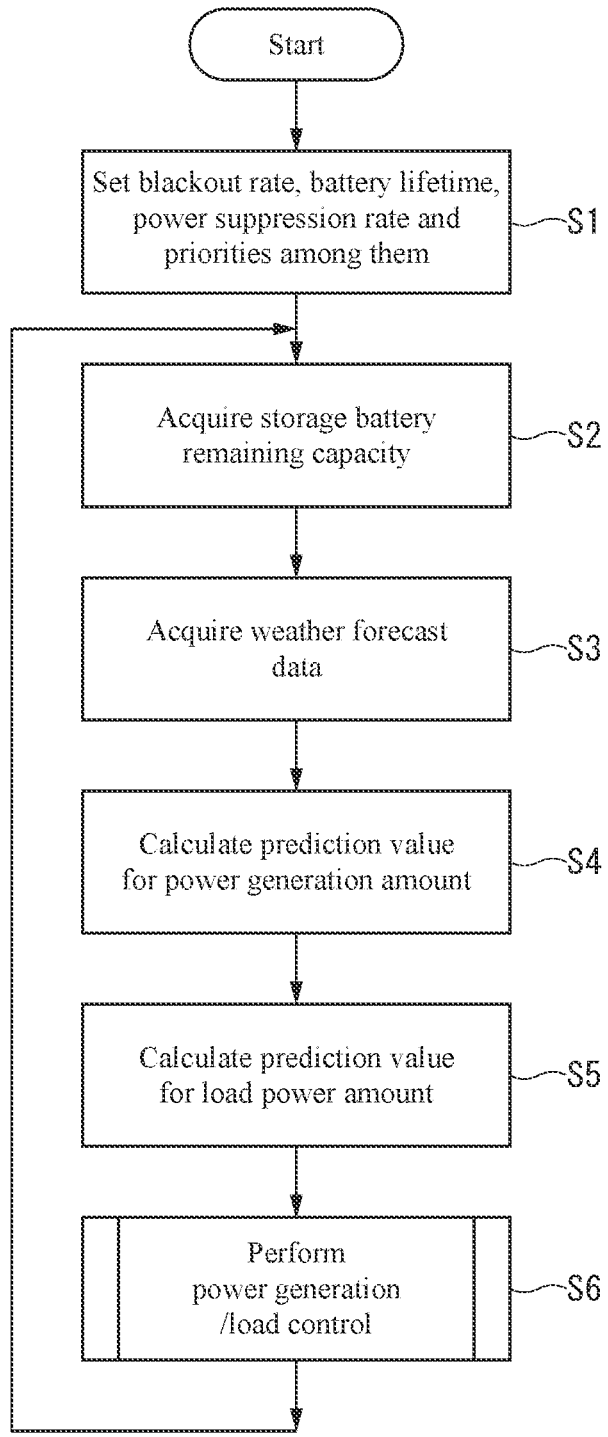
FIG. 4 is a flowchart of power generation/load control by the power management apparatus 60.

FIG. 4 is a flowchart of power generation/load control by the power management apparatus 60.

As illustrated in FIG. 4, the target value setting part 64 of the power management apparatus 60 sets the target blackout rate, target battery lifetime, and target power suppression rate (step S1). The "blackout rate" refers to a ratio of a time period allowing the blackout in one day (blackout time/24 hours), and the "target blackout rate" is a target value for the blackout rate specified by the administrator. For example, when the target blackout rate is 10%, the power management apparatus 60 controls the power demand of the entire system such that the blackout time does not exceed 144 minutes. The "battery lifetime" refers to usable years (usable days) of the storage battery when charging/discharging is performed once a day, and the "target battery lifetime" is a target value for the battery lifetime specified by the administrator. The "power suppression rate" refers to a ratio of suppression of the amount of power consumption contracted by a customer (usable power amount/contract power amount), and the target power suppression rate is a target value for the power suppression rate specified by the administrator.

The priority setting part 65 of the power management apparatus 60 sets the priorities among control for the blackout rate, control for the battery lifetime, and control for the power suppression rate (step S1). As described above, the priorities among control for the blackout rate, control for the battery lifetime, and control for the power suppression rate may be set manually by the administrator or may be set automatically by the power management apparatus 60 as recommended values.

Then, the power management apparatus 60 acquires the remaining capacity of the storage battery 50 (step S2). The remaining capacity of the storage battery 50 is the remaining capacity of each of the storage batteries 50A to 50C or an average value of the remaining capacities of the storage batteries 50A to 50C. The remaining capacity of each of the storage batteries 50A to 50C is managed by the BMU, and the BMU can provide storage battery remaining capacity data to the power management apparatus 60 periodically or in response to a request from the power management apparatus 60.

Then, the weather data acquisition part 61 of the power management apparatus 60 acquires weather forecast data (step S3). The weather forecast data can be acquired from a weather information service provider over Internet.

Further, the power amount estimator 63 calculates prediction values for the power generation amount and load power amount (steps S4 and S5). In the case of solar power generation, for example, it can be estimated that the power generation amount increases when fine weather continues, while the power generation amount decreases when cloudy or rainy days continue. As for the load power amount, it can be estimated that the power consumption increases during a period in which temperature is high and hence the operating rate of an air conditioner is high, while the power consumption decreases during a period in which temperature is not high and hence the air conditioner operating rate is low.

Then, the power management apparatus 60 performs power generation control and load control based on the remaining capacity of the storage battery 50, prediction value for the power generation amount, prediction value for the load power amount, target blackout rate, target battery lifetime, target power suppression rate, priorities among the blackout rate, battery lifetime, and power suppression rate, and the like (step S6). Hereinafter, the power generation/load control will be described in detail.

Figure 5:
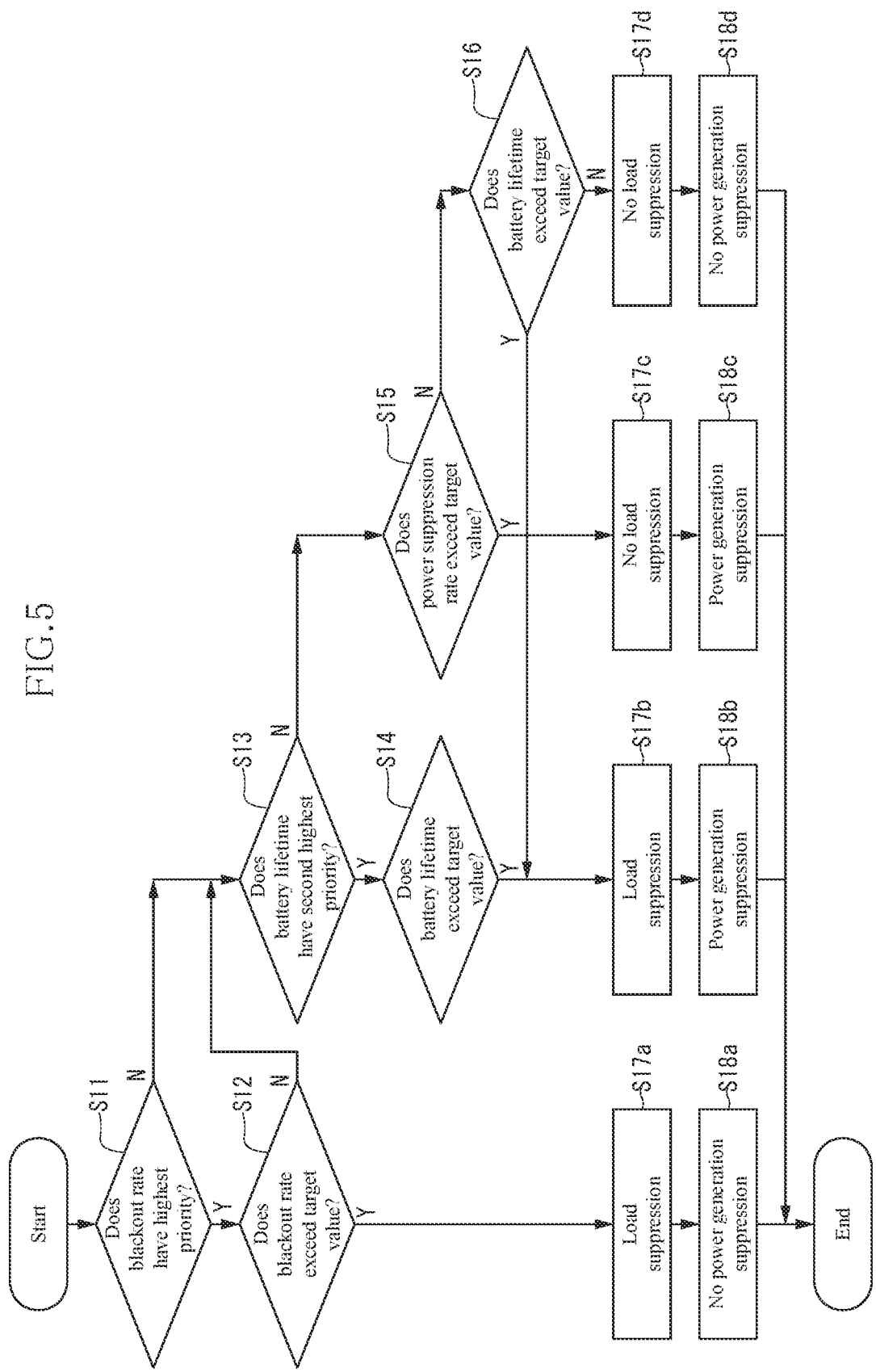
FIG. 5 is a flowchart of the power generation/load control performed when the blackout rate has the highest priority.

FIG. 5 is a flowchart of the power generation/load control performed when the blackout rate has the highest priority.

As illustrated in FIG. 5, when the "blackout rate" has the highest priority among the above three control parameters (Y in step S11), the power management apparatus 60 determines whether the current blackout rate exceeds the target value (step S12). When determining that the current blackout rate exceeds the target value (Y in S12), the power management apparatus 60 controls the second DC-DC converter 22 connected to the load device 40 to perform load suppression (step S17*a*), while it maintains the operation of the first DC-DC converter 21 connected to the natural energy power generator 30 to perform no power generation suppression (step S18*a*). By thus limiting a load power to be supplied to the load device 40 by means of the second DC-DC converter 22, it is possible to avoid a situation in which a blackout state continues longer than necessary while allowing some level of blackout. When the power demand of the load device 40 exceeds the total amount of the power generation amount and the amount of power supplied from the storage battery 50 under the condition that the blackout rate is set to 0%, the load suppression is constantly performed.

On the other hand, when determining that the current blackout rate is equal to or less than the target value (N in step S12), the power management apparatus 60 determines which one of the battery lifetime and power suppression rate is the second highest control parameter (step S13). When determining that the battery lifetime is higher in priority (Y in step S13), the power management apparatus 60 determines whether the current battery lifetime exceeds the target value (step S14). When determining that the current battery lifetime exceeds the target value (Y in step S14), the power management apparatus 60 controls the second DC-DC converter 22 connected to the load device 40 to perform the load suppression (step S17*b*) and controls the first DC-DC converter 21 connected to the natural energy power generator 30 to perform the power generation suppression (step S18*b*).

During the power generation suppression, it is preferable to not only control the first DC-DC converter 21 but also issue a command to the natural energy power generator 30 to suppress the power generation amount itself. In the case of the solar power generator 30A, power generation output may be reduced under MPPT control for the power conditioner, and when there are multiple solar panels, the number of panels effective to supply power to the power conditioner may be reduced by a switching operation of a switch.

Specifically, when the load power exceeds the generated power, the load power is suppressed so as to prevent the storage battery 50 from being rapidly discharged. Rapid discharging performance of the storage battery 50 reduces the battery lifetime, but slow discharging performance of the storage battery 50 can prolong the battery lifetime. On the other hand, when generated power exceeds the load power, the generated power is suppressed so as to prevent the storage battery 50 from being rapidly charged. Rapid charging performance of the storage battery 50 reduces the battery lifetime, but slow charging performance of the storage battery 50 can prolong the battery lifetime. By thus suppressing the charge/discharge operation of the storage battery 50, the battery lifetime can be prolonged.

When the power suppression rate is higher in priority than the battery lifetime (N in step S13), the power management apparatus 60 determines whether the current power suppression rate exceeds the target value (step S15). When determining that the current power suppression rate exceeds the target value (Y in step S15), the power management apparatus 60 controls, while maintaining the operation of the second DC-DC converter 22 connected to the load device 40 (step S17c), the first DC-DC converter 21 connected to the natural energy power generator 30 to perform the power generation suppression (step S18c). This can prevent the generation of more power than necessary.

When determining that the current power suppression rate is equal to or less than the target value (N in step S15), the power management apparatus 60 maintains the operation of the second DC-DC converter 22 connected to the load device 40 and the operation of the first DC-DC converter 21 connected to the natural energy power generator 30 to perform no load suppression and no power generation suppression as long as the current battery lifetime does not exceed the target value (N in step S16, step S17d, and step S18d). When the current battery lifetime exceeds the target value (Y in step S16), the power management apparatus 60 performs the load suppression and power generation suppression (step S17b and step S18b).

As described above, when the control for the blackout rate has the highest priority, power generation and load are periodically predicted and, when the current blackout rate exceeds the target value, the power management apparatus 60 performs the load suppression without performing the power generation suppression, making it possible to control the blackout rate to the target value or less.

Figure 6:
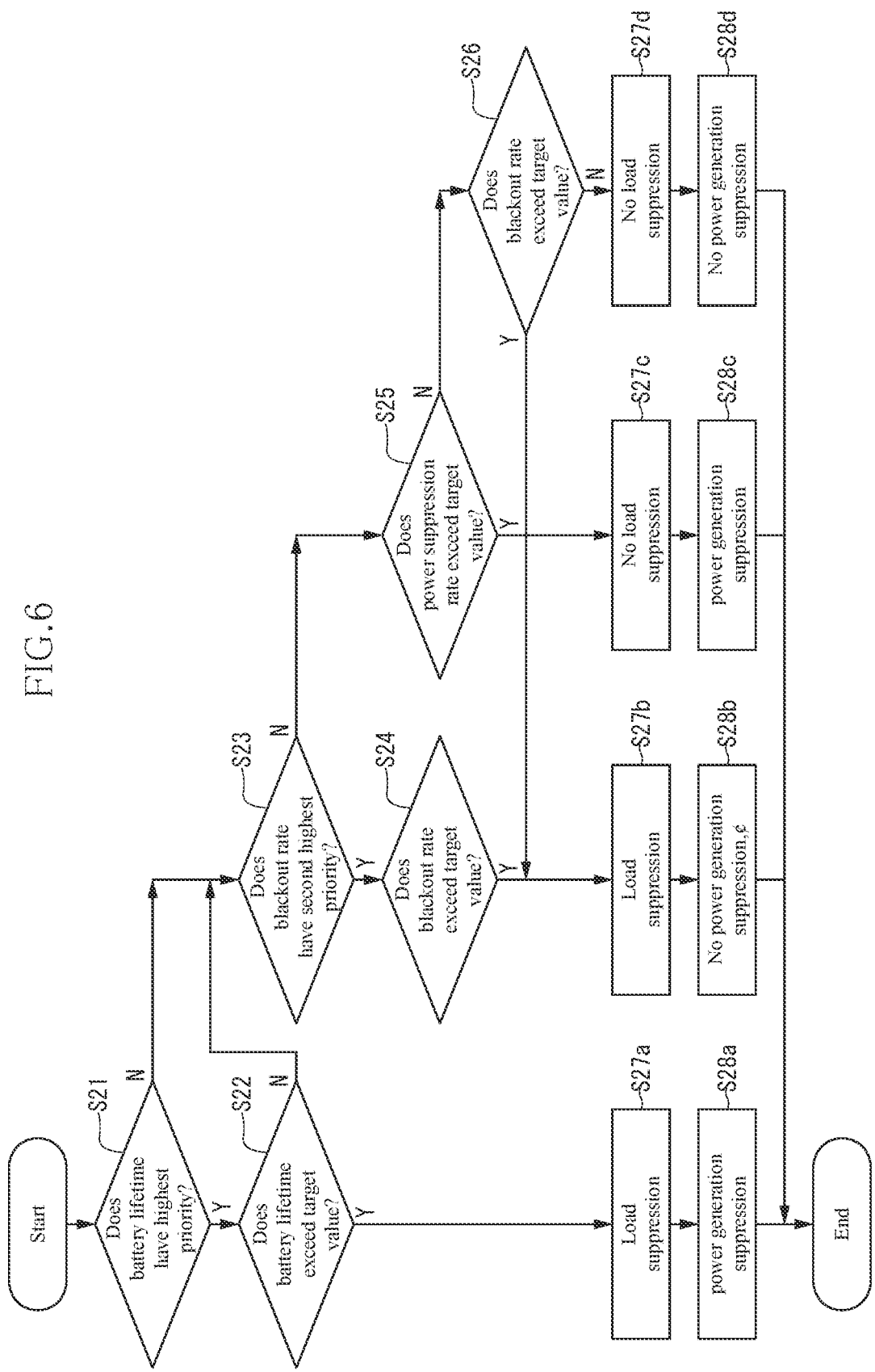
FIG. 6 is a flowchart of the power generation/load control performed when the battery lifetime has the highest priority.

FIG. 6 is a flowchart of the power generation/load control performed when the battery lifetime has the highest priority.

As illustrated in FIG. 6, when the "battery lifetime" has the highest priority among the above three control parameters (Y in step S21), the power management apparatus 60 determines whether the current battery lifetime exceeds the target value (step S22). When determining that the current battery lifetime exceeds the target value (Y in S22), the power management apparatus 60 controls the second DC-DC converter 22 connected to the load device 40 to perform load suppression (step S27a) and controls the first DC-DC converter 21 connected to the natural energy power generator 30 to perform power generation suppression (step S28a). Specifically, when the load power exceeds the generated power, the load power is suppressed so as to prevent the storage battery 50 from being rapidly discharged. On the other hand, when generated power exceeds the load power, the generated power is suppressed so as to prevent the storage battery 50 from being rapidly charged. By thus suppressing the charge/discharge operation of the storage battery 50, the battery lifetime can be prolonged.

On the other hand, when determining that the current battery lifetime is less than the target value (N in step S22), the power management apparatus 60 determines whether the blackout rate or power suppression rate is the second highest control parameter (step S21). When determining that the blackout rate is higher in priority (Y in step S23), the power management apparatus 60 determines whether the current blackout rate exceeds the target value (step S24). When determining that the current blackout rate exceeds the target value (Y in step S24), the power management apparatus 60 controls the second DC-DC converter 22 connected to the load device 40 to perform load suppression (step S27b), while it maintains the operation of the first DC-DC converter 21 connected to the natural energy power generator 30 to perform no power generation suppression (step S28b). By thus limiting a load power to be supplied to the load device 40 by means of the second DC-DC converter 22, it is possible to avoid a situation in which a blackout state continues longer than necessary while allowing some level of blackout.

When the power suppression rate is higher in priority than the blackout rate (N in step S23), the power management apparatus 60 determines whether the current power suppression rate exceeds the target value (step S25). When determining that the current power suppression rate exceeds the target value (Y in step S25), the power management apparatus 60 maintains the operation of the second DC-DC converter 22 connected to the load device 40 to perform no load suppression (step S27c), while it controls the first DC-DC converter 21 connected to the natural energy power generator 30 to perform the power generation suppression (step S28c). By thus limiting the generated power from the natural energy power generator 30 by means of the first DC-DC converter 21, it is possible to prevent the generation of more power than necessary.

When determining that the current power suppression rate is equal to or less than the target value (N in step S25), the power management apparatus 60 maintains the operation of the second DC-DC converter 22 connected to the load device 40 and the operation of the first DC-DC converter 21 connected to the natural energy power generator 30 to perform no load suppression and no power generation suppression as long as the current blackout rate does not exceed the target value (N in step S26, step S27d, and step S28d). When the current blackout rate exceeds the target value (Y in step S26), the power management apparatus 60 performs the load suppression (step S27b) and no power generation suppression (step S28b).

As described above, when the control for the battery lifetime has the highest priority, power generation and load are periodically predicted and, when the current battery lifetime exceeds the target value, the power management apparatus 60 performs both the load suppression and power generation suppression, making it possible to control the battery lifetime to the target value or less.

FIG. 7 is a flowchart of the power generation/load control performed when the power suppression rate has the highest priority.

As illustrated in FIG. 7, when the "power suppression rate" has the highest priority among the above three control parameters (Y in step S31), the power management apparatus 60 determines whether the current power suppression rate exceeds the target value (step S32). When determining that the current power suppression rate exceeds the target value (Y in S32), the power management apparatus 60 maintains the operation of the second DC-DC converter 22 connected to the load device 40 to perform no load suppression (step S37a), while it controls the first DC-DC converter 21 connected to the natural energy power generator 30 to perform the power generation suppression (step S38a). By thus limiting the generated power from the natural energy power generator 30 by means of the first DC-DC converter 21, it is possible to prevent the generation of more power than necessary.

When determining that the current power suppression rate is equal to or less than the target value (N in step S32), the power management apparatus 60 determines whether the blackout rate or battery lifetime is the second highest control parameter (step S33). When determining that the blackout rate is higher in priority (Y in step S33), the power management apparatus 60 determines whether the current blackout rate exceeds the target value (step S34). When determining that the current blackout rate exceeds the target value (Y in step S34), the power management apparatus 60 controls the second DC-DC converter 22 connected to the load device 40 to perform the load suppression (step S37b), while it maintains the operation of the first DC-DC converter 21 connected to the natural energy power generator 30 to perform no power generation suppression (step S38b). By thus limiting a load power to be supplied to the load device 40 by means of the second DC-DC converter 22, it is possible to avoid a situation in which a blackout state continues longer than necessary while allowing some level of blackout.

When the battery lifetime is higher in priority than the blackout rate (N in step S33), the power management apparatus 60 determines whether the current battery lifetime exceeds the target value (step S35). When determining that the current battery lifetime exceeds the target value (Y in step S35), the power management apparatus 60 controls the second DC-DC converter 22 connected to the load device 40 to perform the load suppression (step S37c) and controls the first DC-DC converter 21 connected to the natural energy power generator 30 to perform the power generation suppression (step S38c). By thus suppressing the charge/discharge operation of the storage battery 50, the battery lifetime can be prolonged.

When determining that the current power suppression rate is equal to or less than the target value (N in step S35), the power management apparatus 60 maintains the operation of the second DC-DC converter 22 connected to the load device 40 and the operation of the first DC-DC converter 21 connected to the natural energy power generator 30 to perform no load suppression and no power generation suppression as long as the current battery lifetime does not exceed the target value (N in step S36, step S37d, and step S38d). When the current blackout rate exceeds the target value (Y in step S36), the power management apparatus 60 performs the load suppression (step S37b) and no power generation suppression (step S38b).

As described above, when the control for the power suppression rate has the highest priority, power generation and load are periodically predicted and, when the current power suppression rate exceeds the target value, the power management apparatus 60 performs the power generation suppression without performing the load suppression, making it possible to control the power suppression rate to the target value or less.

As described above, the DC power supply system according to the present embodiment uses battery lifetime as one of a plurality of control parameters and controls the plurality of control parameters in accordance with the priorities set therefor. Thus, it is possible to perform control to prolong the battery lifetime while, for example, allowing, to some degree, wastes involved in loss reduction for power generation and the restriction of use of the load device, which achieves running cost reduction for the system.

While the preferred embodiments of the present invention have been described, the present invention is not limited to the above embodiments, and various modifications may be made within the scope of the present invention, and all such modifications are included in the present invention.

REFERENCE SIGNS LIST

1 DC power supply system
10 DC bus
21, 21A, 21B first DC-DC converter
22, 22A-22D second DC-DC converter
23, 23A-23C third DC-DC converter
24 AC-DC converter
30 natural energy power generator
30A solar power generator
30B wind turbine generator
35 diesel generator
40, 40A-40D load device
50, 50A-50C storage battery
60 power management apparatus
61 weather data acquisition part
62 data storage
63 power amount estimator
64 target value setting
65 priority setting part
66 controller
67 communication part
70 communication network
71 administrator terminal

The invention claimed is:

1. A DC power supply system comprising:
a DC bus serving as a bus bar for DC power supply;
first to third DC-DC converters connected to the DC bus;
a natural energy power generator that is connected to the DC bus through the first DC-DC converter and supplies generated power to the DC bus;
a load device that is connected to the DC bus through the second DC-DC converter and receives supply of a load power from the DC bus;
a storage battery that is connected to the DC bus through the third DC-DC converter and configured to be charged with the generated power when the generated power is larger than the load power and to be discharged to supply power to the load device when the generated power is smaller than the load power; and
a power management apparatus that manages operations of the first to third DC-DC converters based on current power generation amount and load power amount, prediction values for future power generation amount and load power amount, the remaining capacity of the storage battery, previously set target values for respective blackout rate, battery lifetime, and power suppression rate, and the priorities among the target values.

2. The DC power supply system according to claim 1, wherein
the power management apparatus includes
a target value setting part for setting the target values for respective blackout rate, battery lifetime, and power suppression rate and
a priority setting part for setting the priorities among the target values for respective blackout rate, battery lifetime, and power suppression rate.

3. The DC power supply system according to claim 2, wherein
the power management apparatus further includes
a weather data acquisition part that acquires weather forecast data,
a data storage that stores data of the power generation amount and load power amount, and a power amount estimator that estimates a future power generation amount and a future load power amount based on the weather forecast data and the data of the power generation amount and load power amount stored in the data storage.

4. The DC power supply system according claim 1, wherein when the prediction value for the blackout rate exceeds the target value for the blackout rate, the power management apparatus controls the second DC-DC converter so as to suppress the load power amount.

5. The DC power supply system according to claim 1, wherein when the prediction value for the battery lifetime exceeds the target value for the battery lifetime, the power management apparatus controls the second DC-DC converter so as to suppress the load power amount and controls the first DC-DC converter so as to suppress the power generation amount.

6. The DC power supply system according to claim 1, wherein when the prediction value for the power suppression rate exceeds the target value for the power suppression rate, the power management apparatus controls the first DC-DC converter so as to suppress the power generation amount.

7. The DC power supply system according to claim 1, wherein the power management apparatus dynamically changes the priorities among the target values for respective blackout rate, battery lifetime, and power suppression rate.

8. The DC power supply system according to claim 1 further comprising an administrator terminal configured to communicate with the power management apparatus, wherein the power management apparatus notifies the administrator terminal of recommended values for the target values for respective blackout rate, battery lifetime, and power suppression rate and those for the priorities.

9. The DC power supply system according to claim 1, wherein the power management apparatus automatically sets the recommended values for the target values for respective blackout rate, battery lifetime, and power suppression rate, and those for the priorities.

10. The DC power supply system according to claim 1, wherein the first DC-DC converter is a step-up converter that steps up a power from the natural energy power generator and supplies the resultant power to the DC bus, the second DC-DC converter is a step-down converter that steps down a power on the DC bus and supplies the resultant power to the load device, and the third DC-DC converter is a bidirectional DC-DC converter that steps down or up a power on the DC bus and supplies the resultant power to the storage battery, as well as steps up or down a power from the storage battery and supplies the resultant power to the DC bus.

* * * * *